(12) United States Patent
Koshiyama et al.

(10) Patent No.: US 9,052,783 B2
(45) Date of Patent: Jun. 9, 2015

(54) INFORMATION PROCESSING APPARATUS

(75) Inventors: Atsushi Koshiyama, Tokyo (JP); Haruo Oba, Kanagawa (JP); Shintarou Morita, Kanagawa (JP); Minoru Nakano, Kanagawa (JP); Masao Kondo, Tokyo (JP); Hiroaki Adachi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 316 days.

(21) Appl. No.: 13/195,888

(22) Filed: Aug. 2, 2011

(65) Prior Publication Data

US 2012/0032905 A1 Feb. 9, 2012

(30) Foreign Application Priority Data

Aug. 9, 2010 (JP) ................................. 2010-178951

(51) Int. Cl.
*G06F 3/041* (2006.01)
*G06F 3/045* (2006.01)
*G06F 3/044* (2006.01)
*G06F 3/043* (2006.01)

(52) U.S. Cl.
CPC ................ *G06F 3/044* (2013.01); *G06F 3/043* (2013.01)

(58) Field of Classification Search
CPC .................. G06F 3/044; G06F 3/0488; G06F 2203/04101; G06F 3/043
USPC .......................... 345/104, 156–158, 173–176; 178/18.05–18.06, 18.03–18.09; 463/37
See application file for complete search history.

(56) References Cited

U.S. PATENT DOCUMENTS

| 2002/0158838 | A1* | 10/2002 | Smith et al. ................. 345/156 |
| 2006/0197750 | A1* | 9/2006 | Kerr et al. ..................... 345/173 |
| 2008/0122798 | A1 | 5/2008 | Koshiyama et al. |
| 2010/0060475 | A1* | 3/2010 | Choi ............................. 340/689 |
| 2010/0231522 | A1* | 9/2010 | Li ................................ 345/169 |
| 2011/0013785 | A1* | 1/2011 | Kim ............................. 381/107 |

FOREIGN PATENT DOCUMENTS

JP 2008-117371 5/2008

* cited by examiner

*Primary Examiner* — Lun-Yi Lao
*Assistant Examiner* — Ibrahim Khan
(74) *Attorney, Agent, or Firm* — Oblon, McClelland, Maier & Neustadt, L.L.P.

(57) ABSTRACT

An information processing apparatus includes a display unit located on a front surface of a case. The information processing apparatus also includes a sensing unit located on a side surface of the case facing away from the display unit.

22 Claims, 15 Drawing Sheets

FIG. 11
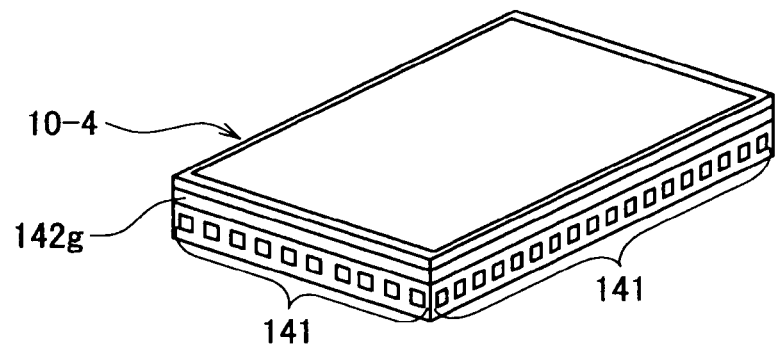
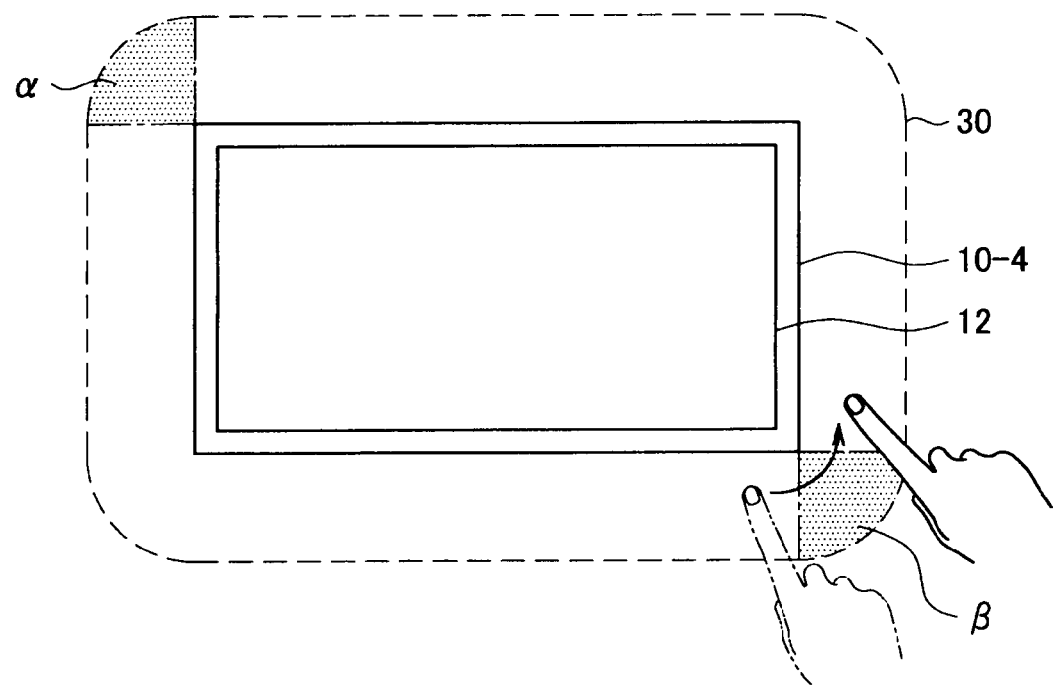

FIG. 12
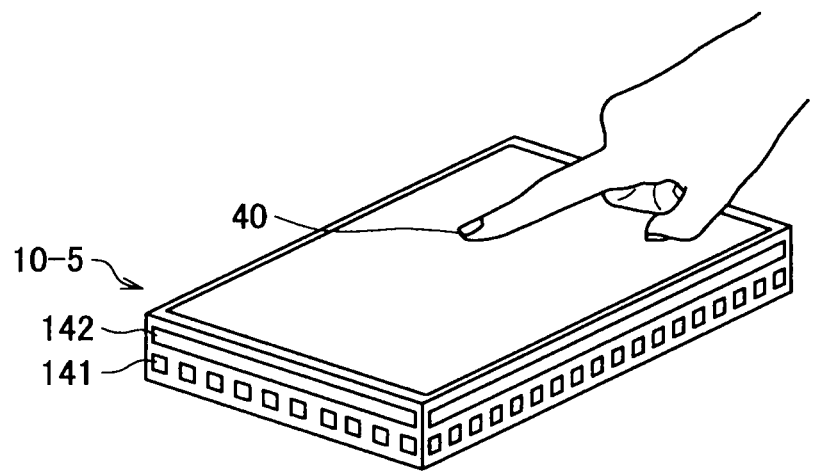
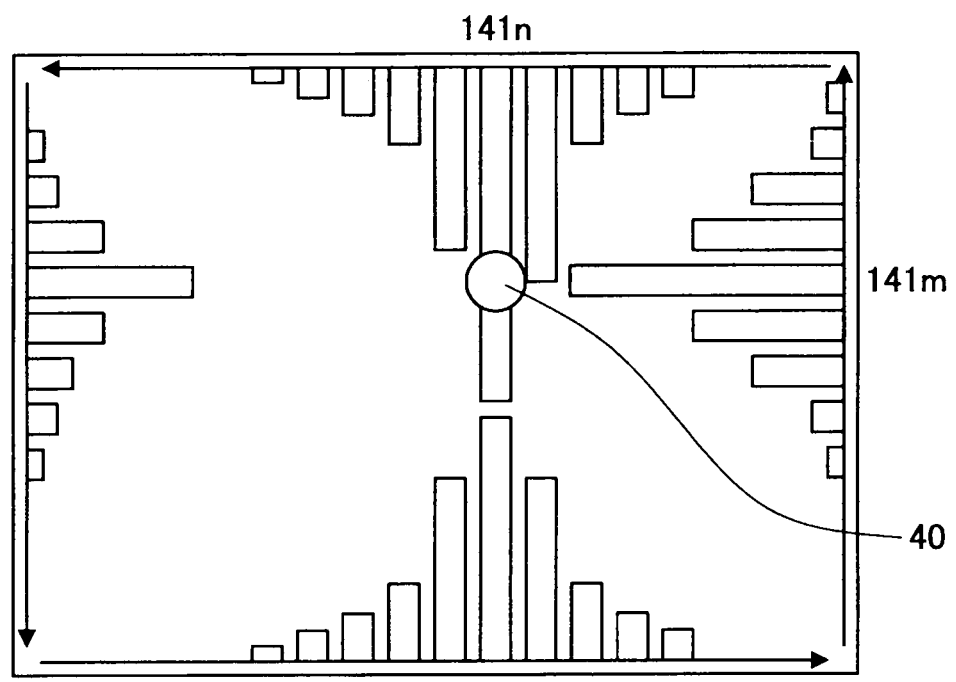

INFORMATION PROCESSING APPARATUS

BACKGROUND

The present disclosure relates to an information processing apparatus.

Mobile appliances such as notebook computers, netbooks, mobile telephones, PDAs (Personal Digital Assistants), digital cameras, and game consoles have become widespread in recent years. Such mobile appliances need to be small and light to make them easy to carry. As one example, a touch panel-type information display apparatus is known where a display function and an operation function are integrated by providing a transparent touch sensor on the display screen of a flat screen-type information display apparatus, which may use a liquid crystal display element, an organic EL (electroluminescent) display element, or the like. Such a touch panel-type information display apparatus receives an operation input (such as a selection of a menu item displayed on a display screen) by detecting a user's finger or the like that touches the touch sensor provided on the display screen. Notebook computers and netbooks equipped with a touchpad that uses a plate-like sensor as a pointing device are also known.

An operation input such as selecting or confirming display information carried out using the touch sensor or touch pad mentioned above is made with the condition that the sensor needs to be completely touched by the user's finger or the like.

Meanwhile, as a new operation input method, a near-field detection-type information display apparatus that receives an operation input in accordance with movement of the user's finger or the like in a noncontact state above the screen of a display panel has been proposed (see Japanese Laid-Open Patent Publication No. 2008-117371).

SUMMARY

As described earlier, since miniaturization is desired for mobile appliances, it is not preferable to provide a touch pad, keyboard, or the like separately from the display screen since it increases the size of the apparatus.

Meanwhile, miniaturization is possible for the touch panel-type information display apparatus described above where the display function and the operation function are combined and for the information display apparatus that detects a position in the space above the screen of the display panel. However, with such information display apparatuses, since the screen (display panel) becomes covered by the user's hand or fingers when making an operation, there has been the problem that the user cannot make an operation while checking the screen, which makes operations difficult.

The present disclosure aims to provide a novel and improved information processing apparatus that is capable of enlarging an operation area.

The information processing apparatus can include a display unit located on a front surface of a case, and a sensing unit located on a side surface of the case facing away from the display unit.

The sensing unit can include a plurality of sensors disposed in a longitudinal direction of the case and configured to detect a position of an object in the longitudinal direction and to detect a distance between the object and the sensing unit in a direction perpendicular to the longitudinal direction. The display unit can be controlled in accordance with a change in the position and the distance of the object.

The plurality of sensors can include a capacitance sensor.

The information processing apparatus can include a display control unit configured to control, in accordance with a movement of the object, a display position of an object on the display unit.

Adjacent sensors of the plurality of sensors can be disposed with a gap between the adjacent sensors, and the position can be determined by dividing the gap in accordance with a ratio between values obtained by the adjacent sensors.

The sensing unit can include a sensor disposed above or below the plurality of sensors, relative to the front surface of the case. The sensor can be configured to detect the distance in the direction perpendicular to the longitudinal direction. The sensor can be provided in a longer range in the longitudinal direction than is one of the plurality of sensors.

The sensing unit can be provided on a plurality of side surfaces of the case, and the sensor can continuously extend across the plurality of side surfaces.

The sensor can continuously extend across every side surface of the case.

The sensing unit can be provided on a plurality of side surfaces of the case. The sensor can extend as far as opposite ends of one of the side surfaces. The sensor can determine a position of the object in the direction perpendicular to the longitudinal direction.

The sensing unit can be provided on a plurality of side surfaces of the case, and, when the object is moved from an area facing one of the side surfaces of the case to an area facing another one of the side surfaces of the case, the display unit can be controlled to rotate a displayed object.

The sensing unit can be disposed on a plurality of side surfaces of the case, and the position can be determined based on simultaneous values from sensors disposed on different side surfaces of the case.

The information processing apparatus can include an inclination sensor configured to detect an angle of inclination of the information processing apparatus, and the position can be determined based on the angle of inclination.

When the information processing apparatus attaches to a stand, an angle of inclination associated with the stand can be acquired, and the position can be determined based on the angle of inclination.

The information processing apparatus can include a light that illuminates an operation area, wherein the information processing apparatus can set the operation area in accordance with the angle of inclination.

The information processing apparatus can include a first sound pickup unit that picks up a sound, wherein the display unit can be controlled based on the sound.

The sound can be at least one of a tapping and a scraping.

The information processing apparatus can include a second pickup unit that picks up a sound. A phase difference between the sound picked up by the first sound pickup unit and the sound picked up by the second pickup unit can be measured to input an operation.

The information processing apparatus can include a unit that detects that the information processing apparatus has been placed on a horizontal surface. The information processing apparatus can start determining the position when the information processing apparatus has been placed on the horizontal surface.

In another embodiment, the information processing apparatus includes means for displaying an object, the means for displaying located on a front surface of a case. The information processing apparatus also includes means for sensing, the means for sensing located on a side surface of the case facing away from the means for displaying.

In yet another embodiment, a method includes sensing, by a sensing unit located on a side surface of a case facing away from a display unit, an object. The method also includes controlling a display on the display unit based on the sensing, the display unit located on a front surface of the case.

According to the embodiments of the present disclosure described above, it is possible to enlarge the operation area.

BRIEF DESCRIPTION OF THE DRAWINGS

FIG. 11 is a series of diagrams useful in explaining a modification to the first embodiment of the present disclosure;

FIG. 12 is a series of diagrams useful in explaining a modification to the first embodiment of the present disclosure;

DETAILED DESCRIPTION OF THE EMBODIMENTS

Figure 1:
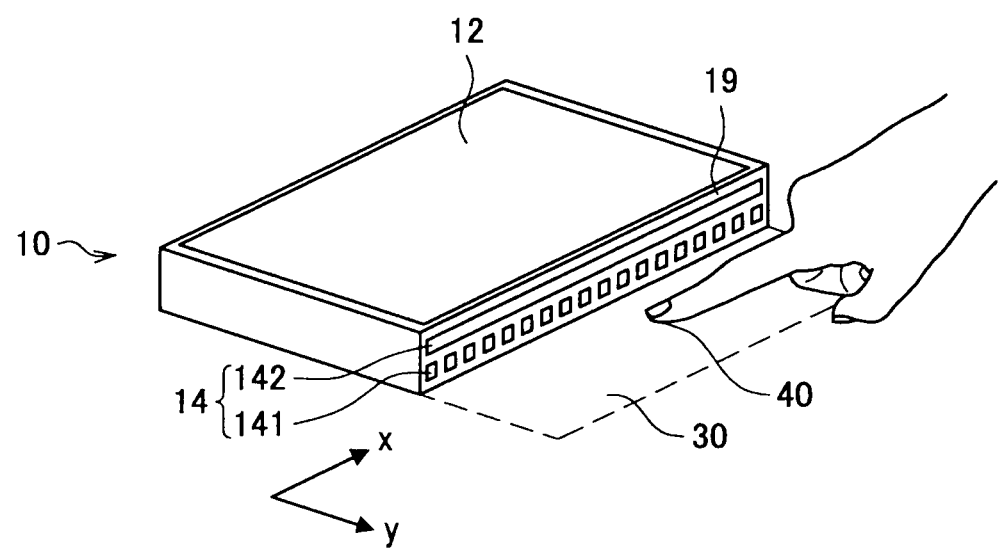
FIG. 1 is an external view of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure are described in the order indicated below.
1. First Embodiment of the Disclosure
   1-1. Configuration of Information Processing Apparatus
   1-2. Overview of the First Embodiment
   1-3. Position Determination in the First Embodiment
   1-4. Modifications to the First Embodiment
2. Second Embodiment of the Disclosure (Configuration Equipped with Inclination Sensor)
3. Third Embodiment of the Disclosure (Configuration Equipped with Edge Light)
4. Fourth Embodiment of the Disclosure (Configuration Equipped with Sound Pickup Unit)
5. Fifth Embodiment of the Disclosure (Start Timing)
6. Conclusion 1. First Embodiment of the Disclosure 1-1. Configuration of Information Processing Apparatus Example of External Appearance of Information Processing Apparatus First, the overall configuration of an information processing apparatus according to a first embodiment of the present disclosure will be described with reference to FIG. 1. FIG. 1 is a schematic external view of the information processing apparatus according to the first embodiment of the present disclosure. As shown in FIG. 1, the information processing apparatus 10 includes a flat-panel display unit 12 and has a capacitance sensor 14 provided on a side surface 19 of a case that constructs the information processing apparatus 10. The flat-panel display unit is an example of a means for displaying. The capacitance sensor 14 is composed of a plurality of X-axis detection electrodes 141 disposed along an x direction that is a "first direction" for the present disclosure and a Y-axis detection electrode 142 disposed across a longer range in the x direction than the individual X-axis detection electrodes 141. The capacitance sensor 14 is an example of a means for sensing.

The capacitance sensor 14 is a distance sensor used to determine the position of an object. More specifically, the X-axis detection electrodes 141 are used to determine the position of an object in at least the x direction and the Y-axis detection electrode 142 is used to determine the position of the object in a y direction. In the following explanation, when it is not especially necessary to distinguish between the X-axis detection electrodes 141 and the Y-axis detection electrode 142, both are collectively referred to as "the capacitance sensor 14". By using the capacitance sensor 14 described above, the information processing apparatus 10 is capable of determining the position of an object in the range of a virtual operation area 30 shown by the broken line in FIG. 1, for example.

Here, the expression "information processing apparatus" is used as a general name for a personal computer, a notebook computer, a netbook, a mobile telephone, a PDA (Personal Digital Assistant), a digital camera, a game console, and the like.

Configuration of Information Processing Apparatus

Figure 2:
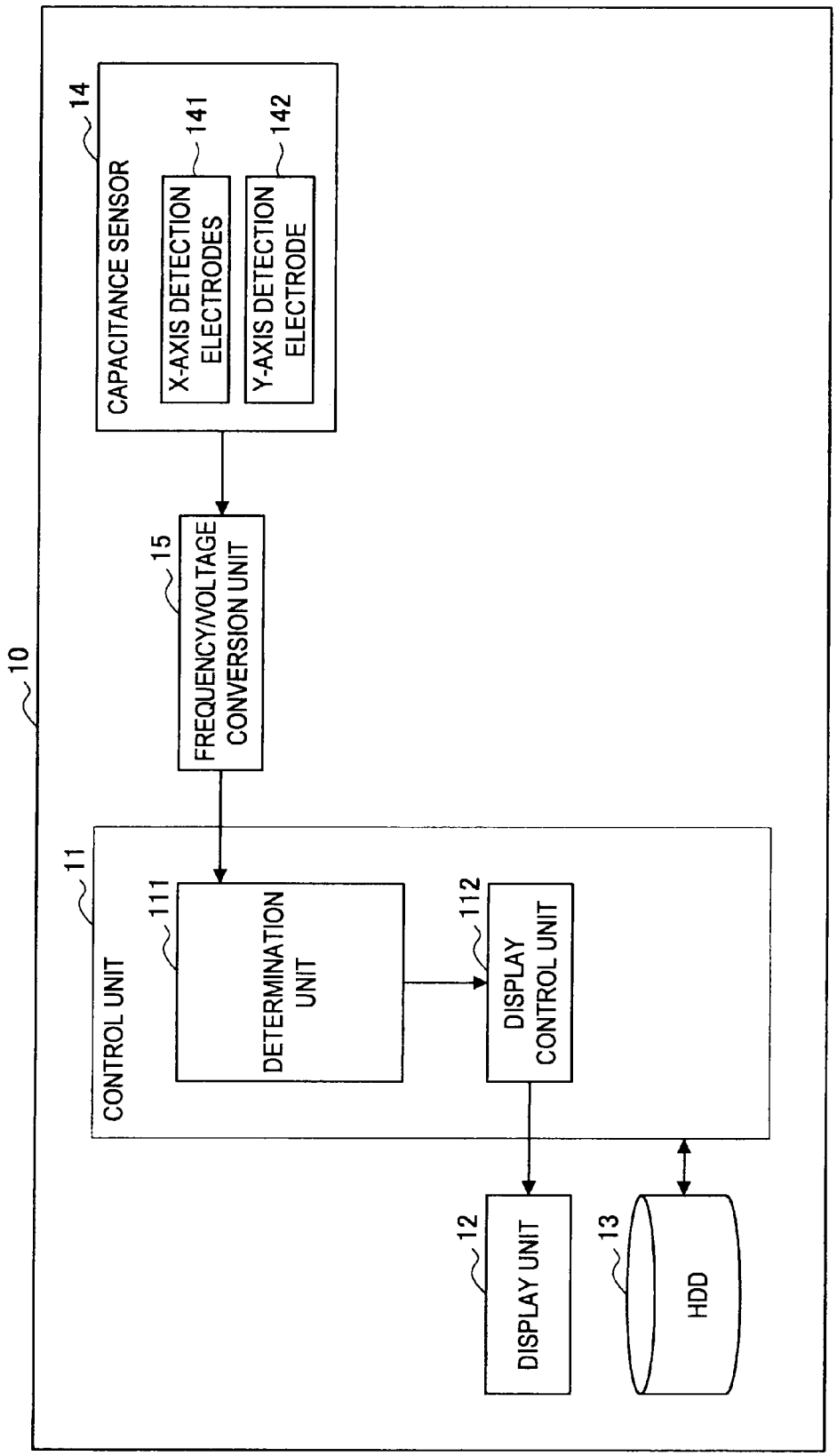
FIG. 2 is a block diagram showing the configuration of an information processing apparatus according to the first embodiment of the present disclosure.

Next, the configuration of the information processing apparatus 10 according to the present embodiment will be described with reference to FIG. 2. FIG. 2 is a block diagram showing the configuration of the information processing apparatus 10 according to the first embodiment of the present disclosure. As shown in FIG. 2, the information processing apparatus 10 according to the present embodiment mainly includes a control unit 11, a display unit 12, a HDD (Hard Disk Drive) 13, the capacitance sensor 14, and a frequency/voltage conversion unit 15. These structural elements will now be described below.

The capacitance sensor 14 detects a value of the capacitance (in reality, a change in frequency) between the capacitance sensor 14 and the object. In the present embodiment, spatial detection of the object is carried out using the plurality of X-axis detection electrodes 141 and the Y-axis detection electrode 142 as the capacitance sensor 14. In the present embodiment, the object is a fingertip 40 on the user's hand and the capacitance sensor 14 determines the spatial position of the fingertip 40, but the object is not limited to the fingertip 40 and may be a specified object or a moving body. Also, although the capacitance sensor 14 is used as one example of a distance sensor that detects the distance to the fingertip 40, the expression "distance sensor" for the present disclosure is not limited to the capacitance sensor 14.

Next, the configuration of the capacitance sensor 14 will be described. The capacitance sensor 14 is an oscillator circuit including a resistance R, an inductance L, and a capacitance C. The value of the capacitance C changes according to the position of the fingertip 40 and the capacitance sensor 14 obtains such changes in the capacitance C as changes in a frequency f.

The frequency f obtained by the capacitance sensor 14 is supplied to the frequency/voltage conversion unit 15 and the frequency/voltage conversion unit 15 carries out conversion to a voltage in keeping with the value of the frequency f. The voltage V produced by the conversion is supplied to the control unit 11 that includes a CPU or the like.

The voltage V supplied from the frequency/voltage conversion unit 15 (i.e., the detection result produced by the capacitance sensor 14) is used when a determination unit 111 included in the control unit 11 judges the spatial position of the fingertip 40.

Here, as one example, the control unit 11 is realized by a CPU (Central Processing Unit), a ROM (Read Only Memory), a RAM (Random Access Memory), and the like. Thus, the control unit is an example of a means for performing various processing operations.

By using the above configuration, the control unit 11 implements the function of the determination unit 111 that determines a position based on the voltage V supplied from the frequency/voltage conversion unit 15.

In addition, by using the above configuration, the control unit 11 implements the function of a display control unit 112 that controls the display of the display unit 12. The display control unit 112 controls the display content of the display unit 12 provided in the information processing apparatus 10. More specifically, based on the position of the fingertip 40 determined by the determination unit 111, the display control unit 112 controls the position of a mouse pointer displayed on the display unit 12 and controls the display position of various objects in accordance with movement of the fingertip (i.e., changes over time in the position of the fingertip). The display control unit 112 carries out display control when an intermediate state or final result of processing realized by the control unit 11 is displayed on the display screen. Here, the processing implemented by the control unit 11 is displayed on the display unit using a variety of graphical user interface (GUI) elements. Accordingly, the display control unit 112 also implements display control over the various GUI elements displayed on the display screen of the display unit. Such GUI elements may be stored in the HDD 13 or the like, for example, or may be acquired by the information processing apparatus 10 via various transitory networks such as the Internet.

Note that when the control unit 11 implements specified processing, it is possible to use various databases and/or programs stored in the HDD 13 or the like. Thus, the HDD is an example of a non-transitory medium.

The HDD 13 stores various databases and various data used when various processing is carried out by the determination unit 111 and/or the display control unit 112.

1-2. Gist of the First Embodiment

Figure 3:
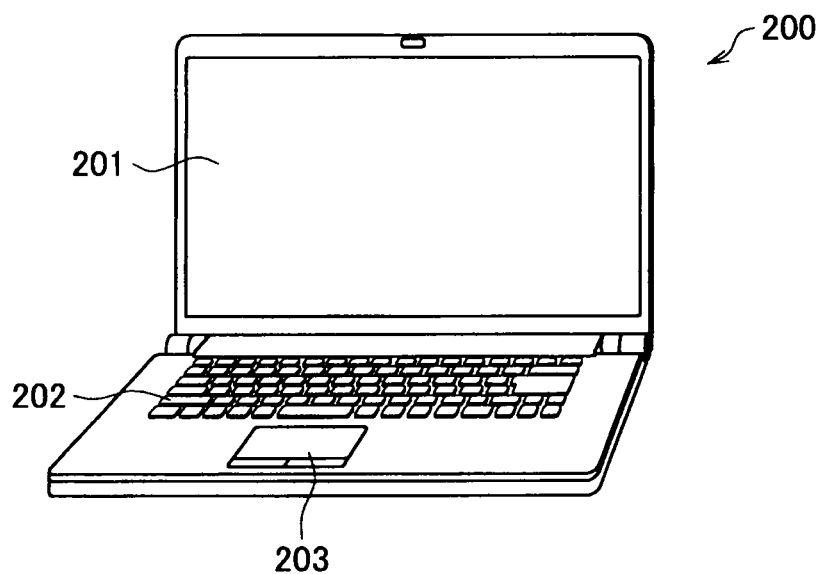
FIG. 3 is a view showing a notebook computer.

As mentioned above in the "SUMMARY" section, for mobile appliances where miniaturization is desired, it is problematic to provide, separately from the display unit, a device for making operation inputs due to the resulting increase in appliance size. As one example, the size of a notebook computer 200 shown in FIG. 3 is increased due to the provision of a keyboard 202 and a touchpad 203 separately from a display unit 201.

Figure 4:
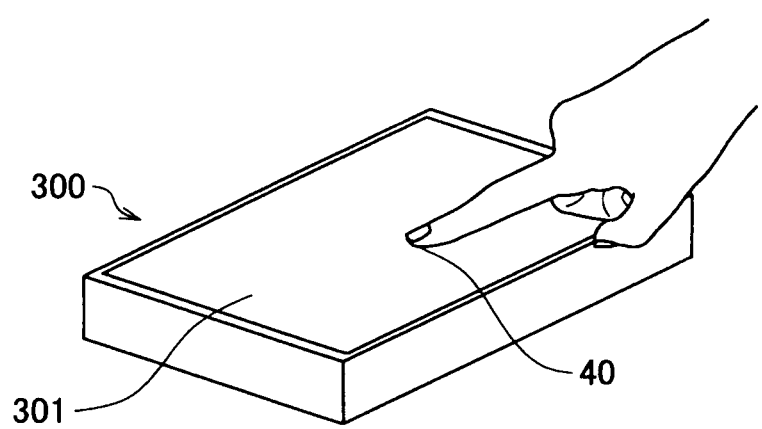
FIG. 4 is a view showing a touch panel-type mobile telephone.

Meanwhile, if a transparent touch sensor is provided on a display unit to integrate the display function and the operation input function, it becomes no longer necessary to provide a device for making operation inputs separately from the display unit, thereby enabling miniaturization of the device. However, like a mobile telephone 300 shown in FIG. 4 for example, when a touch-panel type display unit 301 is provided, since the display unit 301 becomes covered by the operator's hand or fingers, there is the problem that the display screen becomes difficult to see and difficult to operate. The same problem also applies to the information display apparatus described above that carries out position detection in the space above a display panel.

For this reason, by including the capacitance sensor 14 as shown in FIG. 1, it is possible for the information processing apparatus 10 according to the present embodiment of the disclosure to use a wide space outside the information processing apparatus 10 as the virtual operation area 30. By doing so, the operation area can be expanded without increasing the size of the information processing apparatus 10. Also, since the operator's hand or fingers do not cover the display unit 12 when making an operation, the screen is easy to see even when an operation is being made and the operator can make an operation input in a noncontact manner.

Also, in the present embodiment, since the capacitance sensor 14 is disposed on the side surface of the case that constructs the information processing apparatus 10, it is possible to make the apparatus thinner and smaller, which also leads to improvements in design. Position determination by the information processing apparatus 10 according to the present embodiment will now be described in detail below.

1-3. Position Determination in the First Embodiment

First, the process that determines the position of the object in the x direction will be described with reference to FIG. 5. The upper part of FIG. 5 is made up of side views of the information processing apparatus 10, while the lower part shows distributions of voltage values acquired from the respective X-axis detection electrodes 141$a$ to 141$j$ via the frequency/voltage conversion unit 15.

Figure 5:
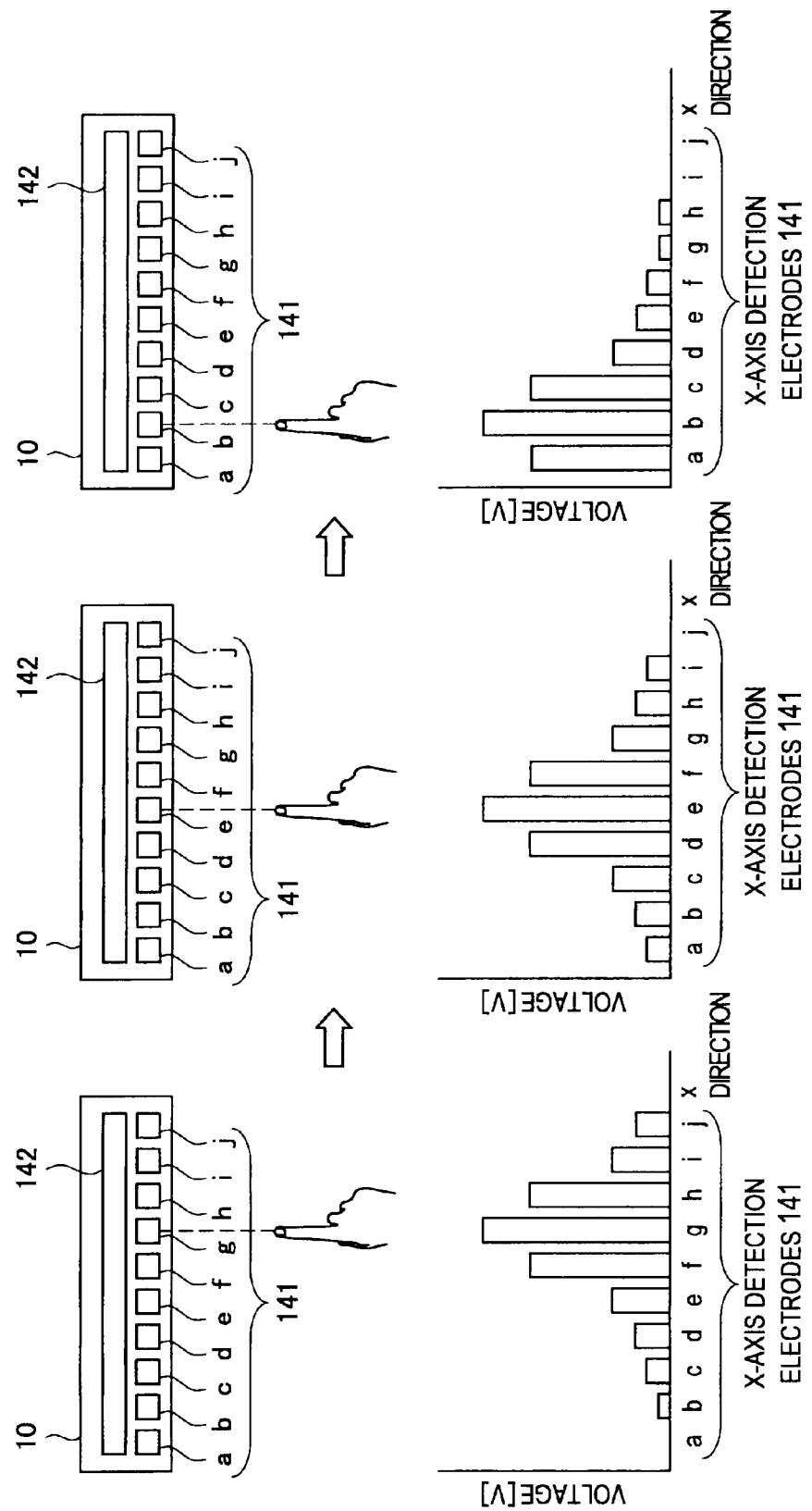
FIG. 5 is a series of diagrams showing the relationship between a plurality of X-axis detection electrodes provided on an information processing apparatus according to the first embodiment of the present disclosure, the position of a fingertip, and voltage values acquired from the respective X-axis detection electrodes.

In the example shown in the upper-left part of FIG. 5, the fingertip is positioned opposite the X-axis detection electrode 141$g$. In this case, in the distribution shown in the lower-left part of FIG. 5, the voltage value acquired from the X-axis detection electrode 141g is the highest. For this reason, the determination unit 111 determines the position in the x direction of the X-axis detection electrode 141g, out of the X-axis detection electrodes 141 disposed along the x direction, as the position of the fingertip in the x direction.

If, after this, the user's finger has moved to a position opposite the X-axis detection electrode 141e as shown in the upper-center part of FIG. 5, the voltage value acquired from the X-axis detection electrode 141e becomes the highest as shown in the lower-center part of FIG. 5. For this reason, the determination unit 111 determines the position in the x direction of the X-axis detection electrode 141e, out of the X-axis detection electrodes 141 disposed along the x direction, as the position of the fingertip in the x direction.

Also, if the finger has moved further as shown on the right side of FIG. 5, according to the same determination criterion as described above, the determination unit 111 determines the position in the x direction of the X-axis detection electrode 141b as the position of the fingertip in the x direction.

In this way, if the position of the finger changes over time from the position of the finger shown on the left side of FIG. 5 to the position of the finger shown in the center and then the position of the finger shown on the right side, it is possible for the determination unit 111 to determine the movement of the finger based on the changes in the distribution of the acquired voltage values.

Next, the process that determines the position of the object in the y direction will be described with reference to FIG. 6. The upper part of FIG. 6 is made up of side views of the information processing apparatus 10, while the lower part shows voltage values acquired from the Y-axis detection electrode 142 via the frequency/voltage conversion unit 15.

Figure 6:
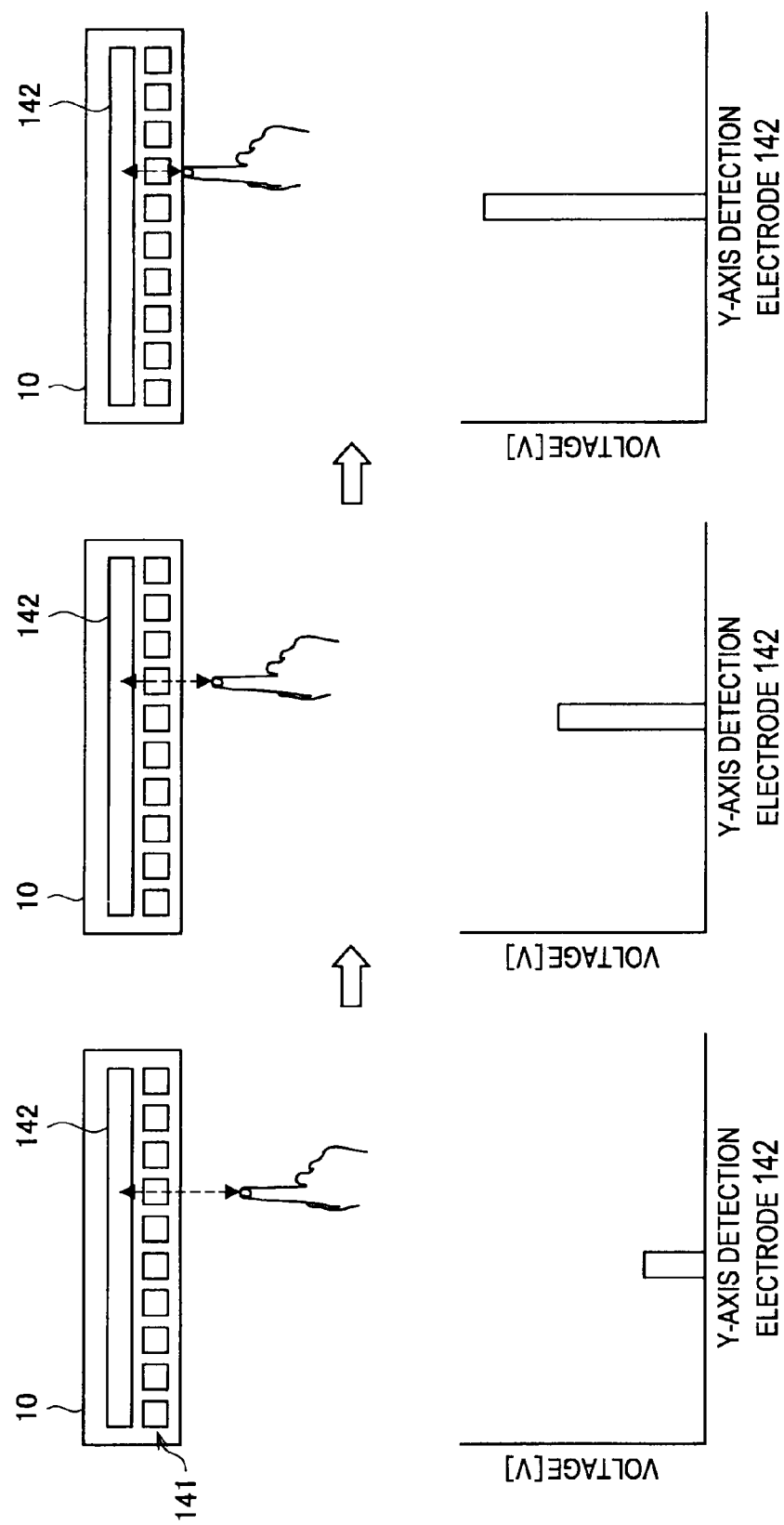
FIG. 6 is a series of diagrams in which a Y-axis detection electrode provided on an information processing apparatus according to the first embodiment of the present disclosure, positions of a fingertip, and voltage values acquired from the Y-axis detection electrode are associated.

In the example shown in the upper-left part of FIG. 6, the fingertip is positioned far from the Y-axis detection electrode 142. In this case, in the graph shown in the lower-left part of FIG. 6, the voltage value acquired from the Y-axis detection electrode 142 is low. Here, the determination unit 111 calculates the distance from the Y-axis detection electrode 142 to the fingertip in accordance with the magnitude of the voltage value to determine the position of the fingertip in the y direction.

In the example shown in the upper-center part of FIG. 6, the fingertip is at a position that is closer to the Y-axis detection electrode 142 than in the example shown on the left. In this case, as shown in the lower-center part of FIG. 6, the voltage value acquired from the Y-axis detection electrode 142 is higher than in the example shown on the left of FIG. 6. Here, the determination unit 111 calculates the distance from the Y-axis detection electrode 142 to the fingertip in accordance with the magnitude of the voltage value to determine the position of the fingertip in the y direction.

In the example shown on the right side of FIG. 6, the fingertip is at a position that is even closer to the Y-axis detection electrode 142 than in the example shown in the center of FIG. 6. Here, in the same way as described above, the determination unit 111 calculates the distance from the Y-axis detection electrode 142 to the fingertip in accordance with the magnitude of the voltage value to determine the position of the fingertip in the y direction.

1-4. Modifications to the First Embodiment

Next, modifications to the first embodiment will be described. First, a first modification to the first embodiment will be described with reference to FIG. 7. As shown in the upper part of FIG. 7, only the plurality of X-axis detection electrodes 141a to 141j are disposed along the x direction on the side surface of an information processing apparatus 10-1 according to this first modification. A distribution of the voltage values acquired via the frequency/voltage conversion unit 15 from the X-axis detection electrodes 141a to 141j is shown in the lower part of FIG. 7.

Figure 7:
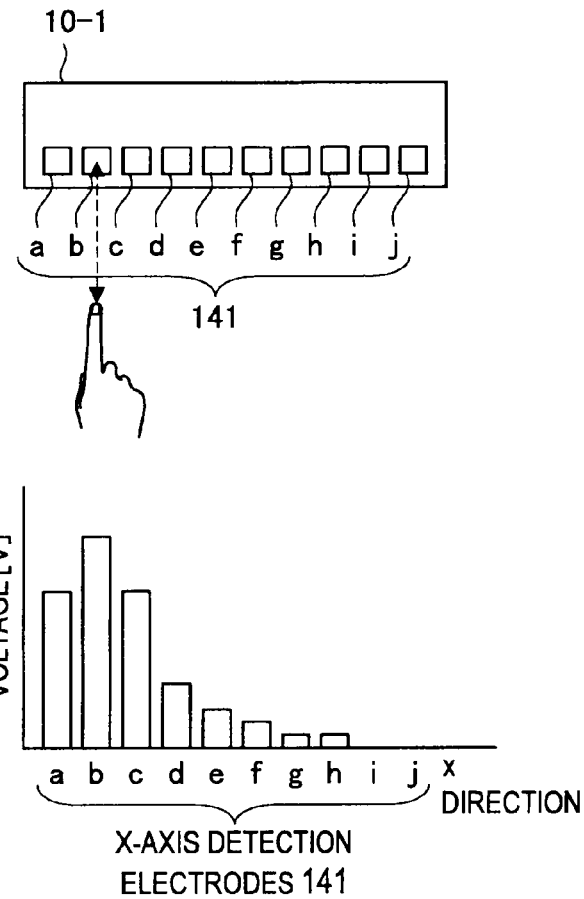
FIG. 7 is a series of diagrams useful in explaining a modification to the first embodiment of the present disclosure.

As shown in the upper part of FIG. 7, the fingertip is at a position opposite the X-axis detection electrode 141b. In this case, in the distribution shown in the lower part of FIG. 7, the voltage value acquired from the X-axis detection electrode 141b is the highest. For this reason, the determination unit 111 determines the position in the x direction of the X-axis detection electrode 141b, out of the X-axis detection electrodes 141 disposed along the x direction, as the position of the fingertip in the x direction.

The determination unit 111 also calculates the distance from the X-axis detection electrodes 141 to the fingertip in accordance with the magnitude of the voltage value acquired from the X-axis detection electrode 141b to determine the position of the fingertip in the y direction.

In this way, the information processing apparatus 10-1 according to the first modification is capable of determining the position of an object in the x direction and in the y direction using only the X-axis detection electrodes.

Next, a compensation process for determining a position more accurately will be described as a second modification. First, a process ("correction") that determines the position of the object in the x direction more accurately will be described. The X-axis detection electrodes 141 are sometimes disposed with gaps between the respective electrodes along the x direction on the side surface 19. Accordingly, when the position of the fingertip in the x direction is a location where no X-axis detection electrode 141 is disposed, it is difficult for the determination unit 111 to accurately determine the position of the fingertip. For this reason, the determination unit 111 calculates (corrects) the position of the fingertip in the x direction based on the voltage values acquired from adjacent X-axis detection electrodes 141 to determine the position more accurately.

Next, the process (correction) that determines the position of the object in the y direction more accurately will be described. For example, there are cases where the Y-axis detection electrode 142 is unable to detect the capacitance between the electrode 142 and the fingertip accurately due to noise. For this reason, with the information processing apparatus 10-2 according to the second modification, by disposing a plurality of Y-axis detection electrodes 142, it is possible to improve the detection accuracy for the capacitance.

Figure 8:
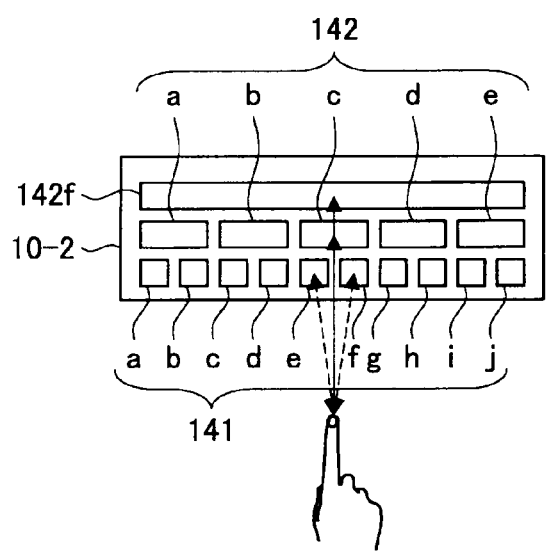
FIG. 8 is a diagram useful in explaining a modification to the first embodiment of the present disclosure.
Figure 9:
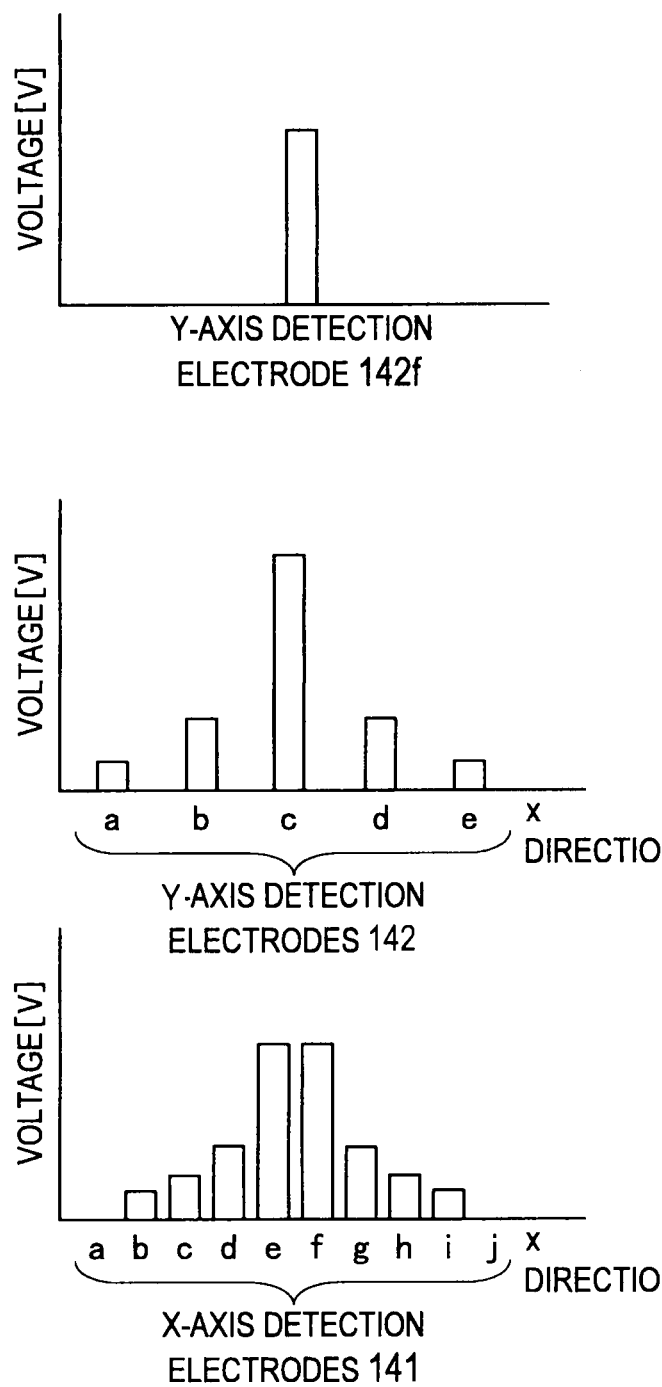
FIG. 9 is a series of diagrams showing voltage values corresponding to a capacitance sensor of the modification shown in FIG. 8.

The correction mentioned above will now be described in detail with reference to FIGS. 8 and 9. As shown in FIG. 8, a plurality of X-axis detection electrodes 141a to 141j are disposed with gaps in between along the x direction on the side surface of the information processing apparatus 10-2. Also, on the side surface of the information processing apparatus 10-2, a plurality of Y-axis detection electrodes 142a to 142e are disposed across longer ranges in the x direction than the respective X-axis detection electrodes 141 and a Y-axis detection electrode 142f is additionally disposed across a longer range in the x direction than the respective Y-axis detection electrodes 142a to 142e. The voltage value acquired from the Y-axis detection electrode 142f in FIG. 8 is shown in the upper part of FIG. 9, the distribution of voltage values acquired from the respective X-axis detection electrodes 141a to 141j in FIG. 8 is shown in the lower part of FIG. 9, and the distribution of voltage values acquired from the respective Y-axis detection electrodes 142a to 142e in FIG. 8 is shown in the center part of FIG. 9.

First, correction of the process that determines the position of the fingertip in the x direction by the determination unit 111 will be described. If, as one example, the values of the voltages acquired from the X-axis detection electrodes 141e and 141f are substantially the same level as shown in the lower part of FIG. 9, the determination unit 111 determines a center point between the X-axis detection electrodes 141e and 141f as the position of the fingertip in the x direction. More generally, the determination unit 111 specifies two X-axis detection electrodes 141 that have acquired the two highest voltage values and determines a position in the x direction found by dividing the gap between the two specified X-axis detection electrodes 141 in accordance with the ratio between the two highest voltage values as the position of the finger in the x direction.

Next, correction of the process that determines the position of the finger in the y direction by the determination unit 111 will be described. As described earlier, the determination unit 111 calculates the distance between the Y-axis detection electrode 142 and the fingertip in accordance with the magnitude of the value of the voltage acquired from the Y-axis detection electrode 142 to determine the position of the fingertip in the y direction. However, there are cases where an accurate detection result is not obtained due to noise or the like. For this reason, as shown in FIG. 8, with the information processing apparatus 10-2 according to the second modification, the Y-axis detection electrode are disposed in two groups (142a to 142e and 142f), so that even when one of such groups is anomalous due to noise or the like, the determination unit 111 is capable of determining the position in the y direction more accurately using the detection result from the other group. Also, when the user's fingertip is positioned between the Y-axis detection electrodes 142c and 142d, for example, it is not possible to accurately calculate the distance from the voltage values acquired from the Y-axis detection electrode 142c and the Y-axis detection electrode 142d. However, even in such case, it is possible to calculate the correct distance to the fingertip based on the voltage value from the Y-axis detection electrode 142f provided in a longer range in the x direction than the Y-axis detection electrodes 142a to 142e.

Note that although the Y-axis detection electrodes 142a to 142e that cover a range (length) in the x direction of two X-axis detection electrodes 141 out of the X-axis detection electrodes 141a to 141j and the Y-axis detection electrode 142f that covers a range (length) in the x direction of all of the X-axis detection electrodes 141a to 141j are disposed in the second modification described with reference to FIG. 8, the present embodiment is not limited to this arrangement. As another example, a plurality of Y-axis detection electrodes 142 that cover a range (length) in the x direction of three X-axis detection electrodes 141 may be disposed.

Figure 10:
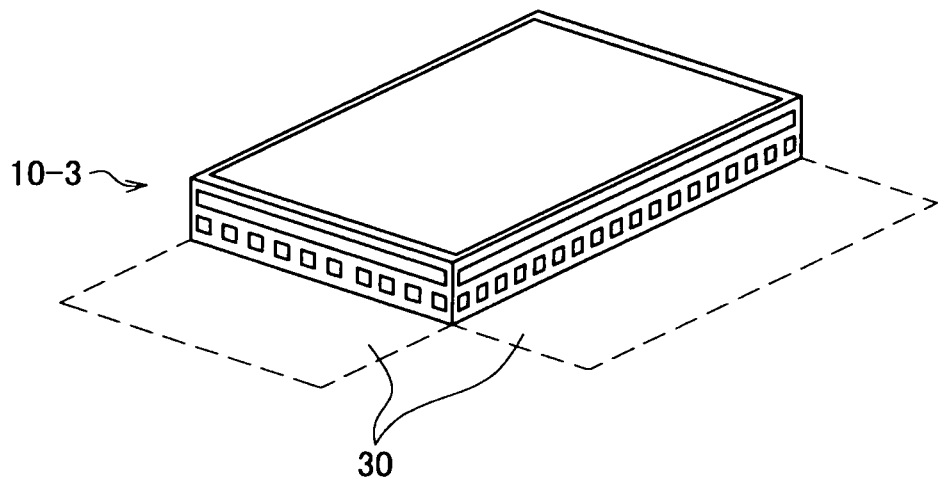
FIG. 10 is a diagram useful in explaining a modification to the first embodiment of the present disclosure.

Next, as a third modification, the capacitance sensor 14 may be provided on a plurality of side surfaces to further increase the virtual operation area 30. As one example of such a third modification, an information processing apparatus 10-3 where the capacitance sensors 14 are provided on two side surfaces is shown in FIG. 10.

Also, as a fourth modification, the Y-axis detection electrode 142 may be disposed so as to extend around every side surface. As one example of such a fourth modification, an information processing apparatus 10-4 where the Y-axis detection electrode 142g extends around every side surface will be described with reference to FIG. 11.

In the upper part of FIG. 11, the external appearance of the information processing apparatus 10-4 equipped with the Y-axis detection electrode 142g is shown, while in the lower part of FIG. 11, the virtual operation area 30 that extends around the information processing apparatus 10-4 is shown.

Although the determination of the position of the fingertip in the x direction and y direction in the virtual operation area 30 is carried out mainly in the same way as described above, in a corner portion α, it is difficult to determine the correct position in the x direction based on the distribution of the voltage values acquired from the X-axis detection electrodes 141. The position of a finger in the y direction in the corner portion α is determined in accordance with the magnitude of the voltage value acquired from the Y-axis detection electrode 142g which is disposed as far as the ends of the side surfaces.

Also, corner portions of the virtual operation area 30 may be set as areas where a gesture input is received. For example, out of the virtual operation area 30 shown in the lower part of FIG. 11, if a gesture has been carried out where the user's fingertip is moved from an area below the information processing apparatus 10-4 through a corner portion β into the area to the right, the determination unit 111 may determine that the fingertip has moved from the lower area into the right area without needing to judge the precise movement path. In this case, the display control unit 112 may carry out a control to rotate an object displayed on the display unit 12 to the right or a control to scroll the display content upward.

Next, as a fifth modification, the virtual operation area 30 may be extended above a case on which a touch sensor is not provided. An information processing apparatus 10-5 where the capacitance sensor 14 is disposed on four side surfaces will be described with reference to FIG. 12 as one example of the fifth modification.

In the upper part of FIG. 12, the external appearance of the information processing apparatus 10-5 according to the fifth modification is shown, and, in the lower part of FIG. 12, the distributions of the voltage values acquired from the respective X-axis detection electrodes 141 disposed on the four side surfaces of the information processing apparatus 10-5, via the frequency/voltage conversion unit 15, are shown.

As the position of the fingertip, the determination unit 111 determines a position of intersection of lines extended inward from positions of the X-axis detection electrodes 141 from which the highest voltage values have been acquired, out of the X-axis detection electrodes 141 disposed on respectively adjacent side surfaces. As one example, in the lower part of FIG. 12, the point of intersection of virtual lines that extend inward from disposed positions of the X-axis detection electrode 141m, from which the highest voltage value has been acquired out of the X-axis detection electrodes 141 disposed on the right side surface, and the X-axis detection electrode 141n, from which the highest voltage value has been acquired out of the X-axis detection electrodes 141 disposed on the upper side surface, is determined as the position of the fingertip 40. Note that it is also possible for the determination unit 111 to determine the distance to the user's finger from the X-axis detection electrode 141n based on the voltage value of the X-axis detection electrode 141n and determine the distance to the user's finger from the X-axis detection electrode 141m based on the voltage value of the X-axis detection electrode 141m. Since capacitance sensors are provided in the information processing apparatus 10-5 as one example of distance sensors, it is possible for the determination unit 111 to determine the position of the fingertip 40 on the display unit 12 even if the fingertip 40 does not contact the display unit 12.

2. Second Embodiment of the Disclosure

Configuration Equipped with Inclination Sensor

Next, an information processing apparatus 10A equipped with an inclination sensor 16 will be described as a second embodiment of the present disclosure.

Figure 13:
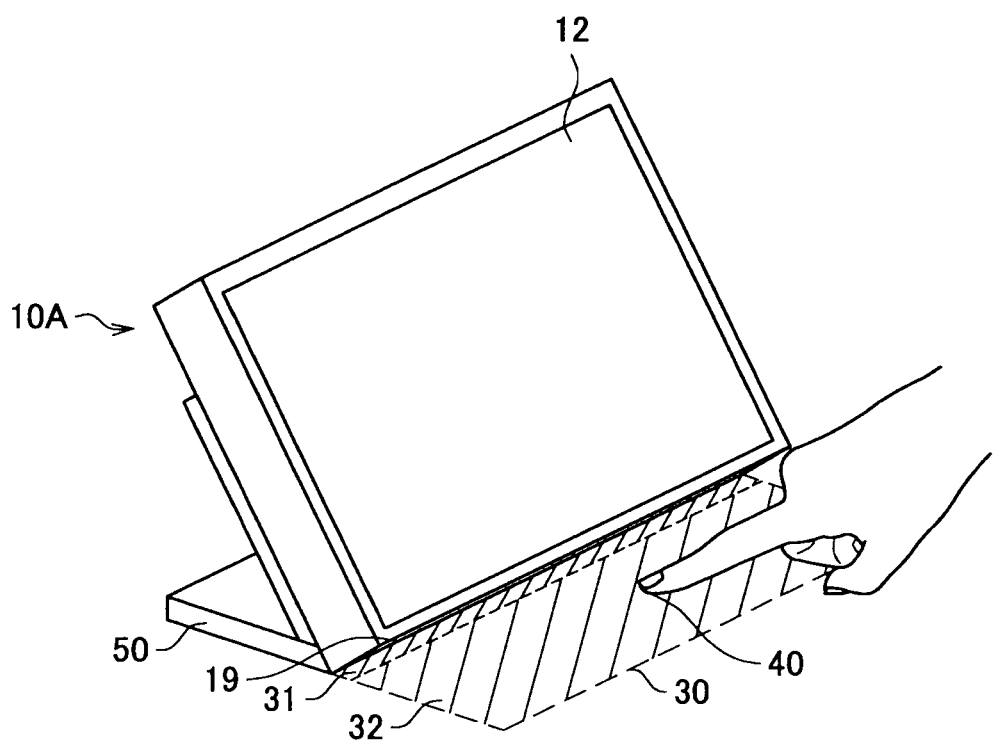
FIG. 13 is a diagram useful in explaining an information processing apparatus according to a second embodiment of the present disclosure

First, one example of a state where the information processing apparatus 10A according to the present embodiment is used in an inclined posture will be described with reference to FIG. 13. FIG. 13 is a diagram showing a state where the information processing apparatus 10A according to the present embodiment is attached to a stand 50. The user fixes the information processing apparatus 10A in an inclined posture by attaching the information processing apparatus 10A to the stand 50 and views moving or still images. On the side surface 19 of the information processing apparatus 10A, a plurality of X-axis detection electrodes 141 are disposed along the x direction and the Y-axis detection electrode 142 is disposed across a longer range in the x direction than the individual X-axis detection electrodes 141. According to the capacitance sensor 14 disposed in this way, the virtual operation area 30 is produced for the information processing apparatus 10A and it is possible for the user to make operations inside the virtual operation area 30.

Figure 14:
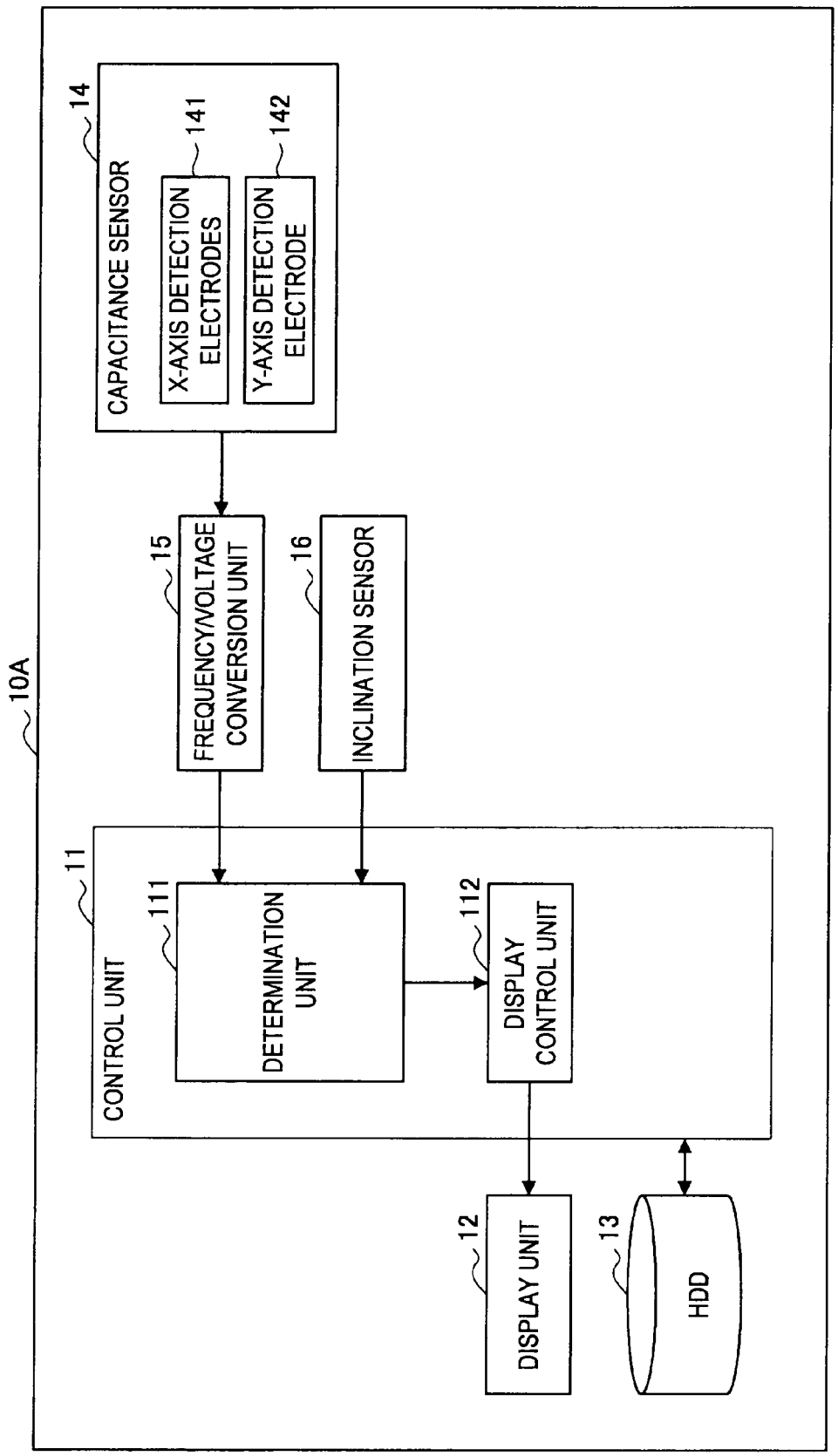
FIG. 14 is a block diagram showing the configuration of an information processing apparatus according to the second embodiment of the present disclosure.

Next, the configuration of the information processing apparatus 10A according to the present embodiment will be described with reference to FIG. 14. The information processing apparatus 10A differs from the configuration of the first embodiment described above with reference to FIG. 2 by being newly equipped with the inclination sensor 16.

The inclination sensor 16 detects the angle of inclination θ of the information processing apparatus 10A. Thus, the inclination sensor is an example of a means for detecting an angle of inclination. The angle of inclination θ detected by the inclination sensor 16 is supplied to the determination unit 111. When determining the position of the fingertip based on the detection result from the capacitance sensor 14, the determination unit 111 corrects an error based on the angle of inclination θ supplied from the inclination sensor 16 to determine the position more accurately.

Here, position determination by the information processing apparatus 10A will be described with reference to FIG. 15. The relationship between the capacitance sensor 14 and the fingertip 40 for a case where the information processing apparatus 10A is in a horizontal posture is shown in the upper part of FIG. 15, and the relationship between the capacitance sensor 14 and the fingertip 40 for a case where the information processing apparatus 10A is in an inclined posture is shown in the lower part of FIG. 15.

Figure 15:
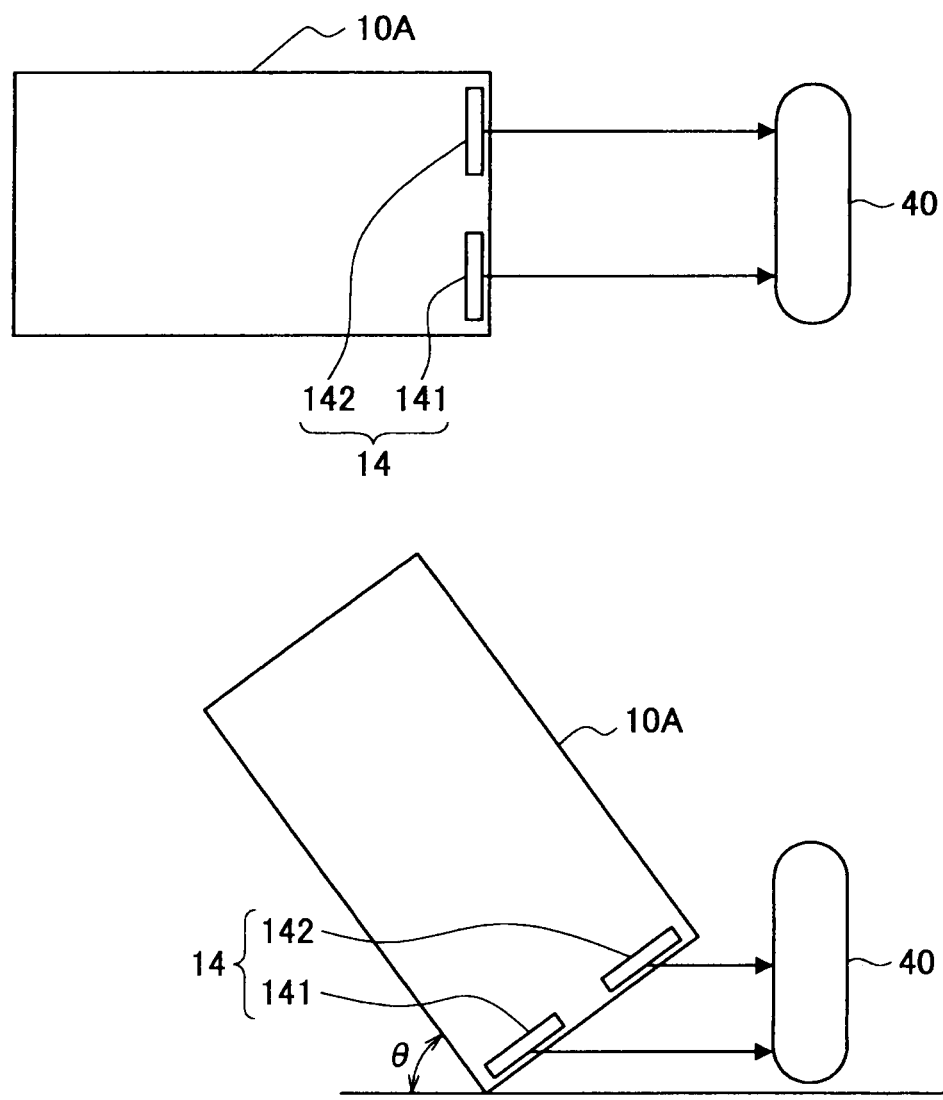
FIG. 15 is a series of diagrams useful in explaining a positional error caused by inclination of the information processing apparatus according to the second embodiment of the present disclosure.

Although the determination unit 111 calculates the distance to the fingertip 40 in accordance with a voltage value acquired from the capacitance sensor 14 to determine the position of the fingertip 40 in the x direction and the y direction, when the information processing apparatus 10A is inclined as shown in the lower part of FIG. 15 for example, the distance to the fingertip 40 will differ from the case where the information processing apparatus 10A is in the horizontal posture shown in the upper part of FIG. 15. For this reason, the determination unit 111 according to the present embodiment determines the position based on detection results that are prioritized in accordance with the angle of inclination θ out of the detection results acquired from the respective electrodes that construct the capacitance sensor 14.

Due to the angle of inclination of the information processing apparatus 10A, a virtual operation area 31 beside the side surface 19 out of the virtual operation area 30 shown in FIG. 13 is difficult to operate. Here, if operation inputs are received with the entire range of the virtual operation area 30 corresponding to the entire range of the display unit 12, there is a problem that the area of the display screen corresponding to the virtual operation area 31 is difficult to operate. For this reason, the information processing apparatus 10A sets a virtual operation area 32 as an effective area in accordance with the angle of inclination θ.

Note that although the present embodiment includes the inclination sensor 16 and detects the angle of inclination of the apparatus itself using the inclination sensor 16, the present disclosure is not limited to this. For example, when no inclination sensor 16 is provided but it has been detected that the information processing apparatus 10A is attached to the stand 50, an angle of inclination associated with the stand 50 may be acquired.

3. Third Embodiment of the Disclosure

Configuration Equipped with Edge Light

Figure 16:
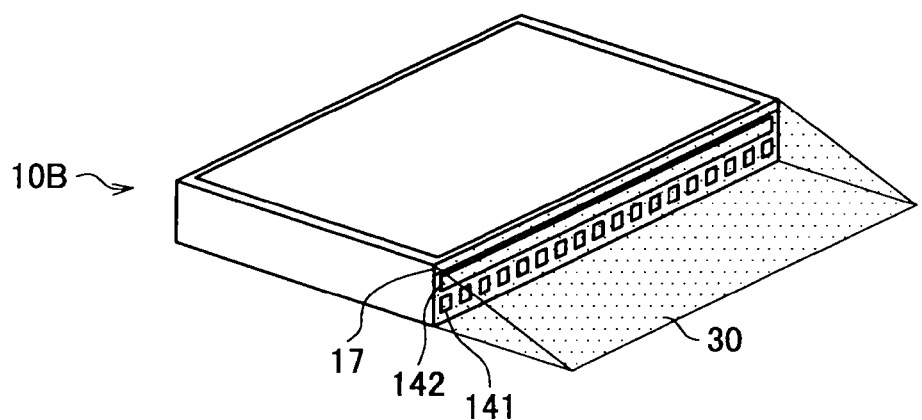
FIG. 16 is an external view of an information processing apparatus according to a third embodiment of the present disclosure.

Next, an information processing apparatus 10B equipped with an edge light 17 will be described with reference to FIG. 16 as a third embodiment of the present disclosure. As shown in FIG. 16, the edge light 17 is provided on the side surface of the information processing apparatus 10B according to the present embodiment. By having the edge light 17 illuminate the virtual operation area 30, it becomes possible for the user to visually confirm the virtual operation area 30.

Note that the disposed position of the edge light 17 shown in FIG. 16 is one example to which the present disclosure is not limited. As one example, lights may be provided on both side surfaces and such lights may protrude from the side surfaces. The edge light 17 and the lights provided on the side surfaces are each an example of a means for illuminating the virtual operation area.

4. Fourth Embodiment of the Disclosure

Configuration Equipped with Sound Pickup Unit

Next, an information processing apparatus 10C equipped with sound pickup units 18 will be described as a fourth embodiment of the present disclosure. According to the present embodiment, it is possible for the user to make an operation input using sound. Although an operation input is made by detecting the position of the user's fingertip 40 in the virtual operation area 30 according to the embodiments described earlier, in the present embodiment it is also possible to input a deciding operation, such as a click or a drag, using sound, such as by tapping a desk.

Figure 17:
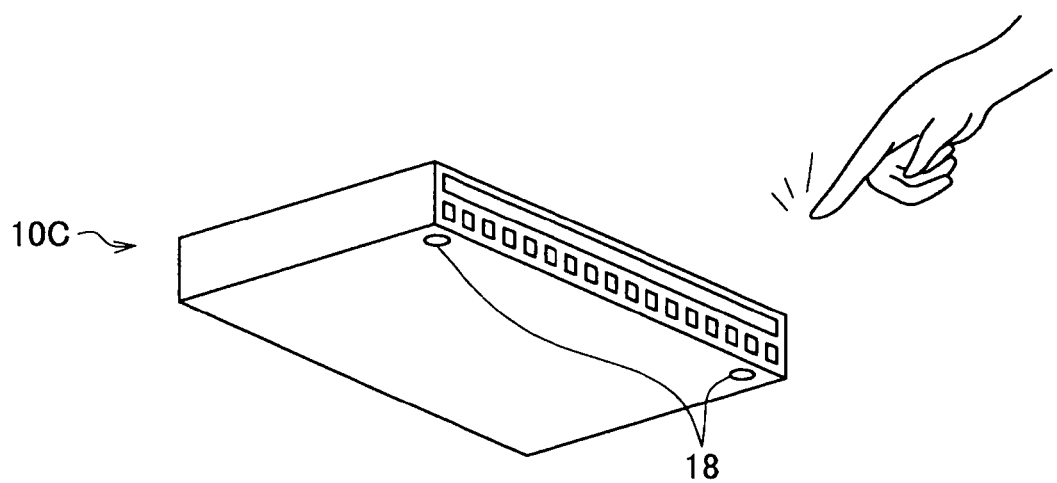
FIG. 17 is an external view of an information processing apparatus according to a fourth embodiment of the present disclosure.

The information processing apparatus 10C according to the present embodiment will now be described with reference to FIG. 17. FIG. 17 is a perspective view showing the appearance of the information processing apparatus 10C according to the present embodiment when looking from below. As shown in FIG. 17, the sound pickup units 18 are provided in a stereo arrangement on the rear surface of the information processing apparatus 10C.

Figure 18:
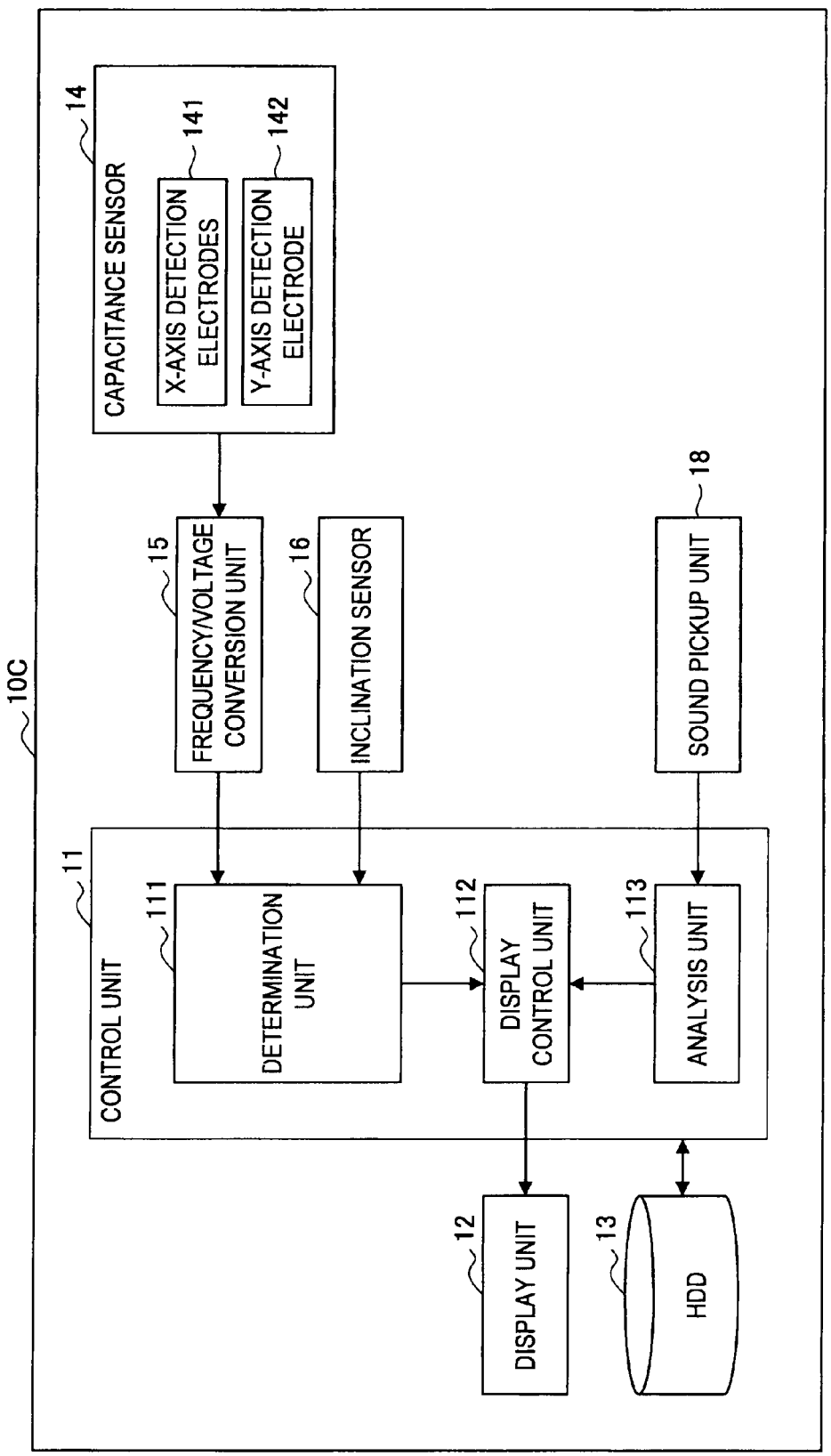
FIG. 18 is a block diagram showing the configuration of an information processing apparatus according to the fourth embodiment of the present disclosure.

Next, the configuration of the information processing apparatus 10C according to the present embodiment will be described with reference to FIG. 18. The information processing apparatus 10C differs from the configuration of the second embodiment described above with reference to FIG. 14 by being newly equipped with the sound pickup units 18 and an analysis unit 113.

The sound pickup units 18 pick up sound in the periphery and supply sound data to the analysis unit 113. That is, the sound pickup units are an example of a means for picking up sound. The analysis unit 113 analyzes the characteristics of the sound data picked up at the sound pickup unit 18 and sends an analysis result to the display control unit 112. More specifically, noise and a user operation are separated from the picked-up sound data and the user operation is sent to the display control unit 112 as the analysis result. The display control unit 112 carries out display control based on the received analysis result.

Next, a specific example of the operation and processing of the sound pickup units 18 and the analysis unit 113 will be described. As one example, the information processing apparatus 10C is placed on a desk and, as shown in FIG. 17, when the user taps the desk (not shown) in the periphery of the apparatus using the thick of the user's finger, the data picked up by the sound pickup units 18 includes the sound of the user tapping the desk with his/her finger and noise in the periphery. The analysis unit 113 compares the data with sound data stored in advance and/or carries out noise filtering or the like to separate the noise and the sound of the user's operation from the picked-up sound data. For example, input of a deciding operation, such as a click or a drag, can be realized by measuring a phase difference together with the sound of the user's operation by the sound pickup units 18.

By carrying out analysis that distinguishes between sounds such as when the user taps using a fingernail, a hitting sound, a scraping sound, or the like aside from when the user taps with the thick of his/her finger, the analysis unit 113 is capable of receiving a variety of operation inputs. Also, since sounds produced on the device and sounds produced on the desk differ according to differences in the material of the desk and the surface material of the device, by carrying out analysis that distinguishes between such sounds, it is possible to receive different operation inputs for the same operation. Also, by changing the surface material of the device, it is possible to increase the number of types of operations that can be inputted.

5. Fifth Embodiment of the Disclosure

Start Timing

Next, the timing at which an operation for determination of a position by the determination unit 111 starts (i.e., is launched) will be described as a fifth embodiment of the present disclosure. As one example, the determination unit 111 according to the present embodiment may start the processing for determining a position when it has been automatically detected that the information processing apparatus 10 has been placed on a desk. Here, as the technology for detecting that the information processing apparatus 10 has been placed on a desk, it is possible to use an infrared sensor, an illumination sensor, a piezoelectric or mechanical contact switch, or the like. The infrared sensor, the illumination sensor, and the piezoelectric or mechanical contact switch are each an example of a means for detecting that the information processing apparatus 10 has been placed on a horizontal surface.

Alternatively, the determination unit 111 may start the processing for determining a position when a start instruction has been inputted intentionally by the user. Such start instruction may be inputted intentionally by the user pressing a specified switch, for example.

6. Conclusion

As described above, according to the embodiments of the present disclosure, it is possible to enlarge the operation area without increasing the size of the information processing apparatus 10. Accordingly, it is possible, even with a miniaturized portable device, for the operator to carry out input operations in a wide space around a device. Also, since the information processing apparatus 10 can judge the position of an object such as the fingertip 40 of the user in a non-contact manner, operability for the operator is improved.

Also, by using the capacitance sensor 14 as a distance sensor, it is possible to realize reduced power consumption compared to an optical sensor or other type of sensor. Also, as described earlier, by using the sound pickup units 18, it becomes possible for the operator to carry out a decision operation such as a click or a drag, thereby realizing the same interface as a touch panel.

Although preferred embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof.

For example, it is also possible to combine the respective structures of the embodiments and modifications described above. As one example, in accordance with the thicknesses of the side surfaces of the information processing apparatus 10, it is possible to provide only the X-axis detection electrodes 141 on one side surface and use such electrodes to carry out positional determination in the x direction and the y direction, and to provide the X-axis detection electrodes 141 and the Y-axis detection electrode 142 on another side surface and use such electrodes to carry out positional determination in the x direction and the y direction.

Also, although configurations where the X-axis detection electrodes 141 and the Y-axis detection electrode 142 are disposed on upper and lower levels on the side surface(s) of the information processing apparatus 10 have been described above in the embodiments, the arrangement of the electrodes is not limited to such an example. For example, the Y-axis detection electrode 142 may be provided on the lower level and the X-axis detection electrodes 141 may be provided on the upper level on the side surface(s) of the information processing apparatus 10.

Although the capacitance sensor 14 is disposed on upper and lower levels on the side surface(s) of the information processing apparatus 10 in the embodiments described above, the arrangement of the capacitance sensor 14 is not limited to such an example. For example, the capacitance sensor 14 may be disposed in layers stacked on top of one another on the side surface(s) of the information processing apparatus 10.

Although the virtual operation area 30 is shown by the broken lines to be mainly rectangular areas in the embodiments described above, the shape of the virtual operation area 30 is not limited to such examples. For example, the virtual operation area 30 may be any shape within a range that can be detected by the capacitance sensor 14. Also, since it is possible for the determination unit 111 to determine the spatial position of an object based on the detection result produced by the capacitance sensor 14, a space in the periphery of the capacitance sensor 14 may be set as the virtual operation area 30.

Although the capacitance sensor 14 is provided on the side surface of the information processing apparatus 10 in the embodiments described above, the surface on which the capacitance sensor 14 is provided is not limited to such an example. For example, if it is possible to detect a spatial position in the periphery of the information processing apparatus 10, the capacitance sensor 14 may be provided anywhere, such as at edge portions of the upper surface of the information processing apparatus 10.

Although the capacitance sensor 14 is provided on the information processing apparatus 10 itself in the embodiments described above, an apparatus equipped with the capacitance sensor 14 is not limited to such an example. As an example application, noncontact electrodes (distance sensors) such as the capacitance sensor 14 may be provided on a frame. By fitting a device that is not equipped with a touch sensor into a frame according to such an example application, it is possible to detect the spatial position of an object in the periphery of the frame and thereby easily provide an operation input area.

The present disclosure contains subject matter related to that disclosed in Japanese Priority Patent Application JP 2010-178951 filed in the Japan Patent Office on Aug. 9, 2010, the entire content of which is hereby incorporated by reference.

What is claimed is:

1. An information processing apparatus, comprising:
a display located on a front surface of a case; and
a sensing unit located on a side surface of the case facing away from the display, the sensing unit including:
(1) a first plurality of sensors disposed on the side surface of the case and configured to detect a position of an object, that does not touch the side surface of the case, in a longitudinal direction of the case,
(2) a sensor disposed on the side surface of the case above or below the plurality of sensors relative to the front surface of the case, the sensor configured to detect a distance between the object and the sensing unit in a direction perpendicular to the longitudinal direction and parallel to the front surface of the case, and
(3) a second plurality of sensors disposed on the side surface of the case above or below the sensor relative to the front surface of the case, the second plurality of sensors configured to detect the distance between the object and the sensing unit in the direction perpendicular to the longitudinal direction and parallel to the front surface of the case.

2. The information processing apparatus according to claim 1,
wherein the plurality of sensors is disposed in the longitudinal direction of the case, and
wherein the display is controlled in accordance with a change in the position and the distance of the object.

3. The information processing apparatus according to claim 2, wherein the sensing unit includes a capacitance sensor.

4. The information processing apparatus according to claim 2, further comprising:
display circuitry configured to control, in accordance with a movement of the object, a display position of an object on the display unit.

5. The information processing apparatus according to claim 2, wherein adjacent sensors of the plurality of sensors are disposed with a gap between the adjacent sensors, and the position is determined by dividing the gap in accordance with a ratio between values obtained by the adjacent sensors.

6. The information processing apparatus according to claim 2, wherein the sensing unit is provided on a plurality of side surfaces of the case, and, when the object is moved from an area facing one of the side surfaces of the case to an area facing another one of the side surfaces of the case, the display is controlled to rotate a displayed object.

7. The information processing apparatus according to claim 2, wherein the sensing unit is disposed on a plurality of side surfaces of the case, and the position is determined based on simultaneous values from sensors disposed on different side surfaces of the case.

8. The information processing apparatus according to claim 2, further comprising:
an inclination sensor configured to detect an angle of inclination of the information processing apparatus, and the position is determined based on the angle of inclination.

9. The information processing apparatus according to claim 8, further comprising:
a light that illuminates an operation area, wherein the information processing apparatus sets the operation area in accordance with the angle of inclination.

10. The information processing apparatus according to claim 2, wherein, when the information processing apparatus attaches to a stand, an angle of inclination associated with the stand is acquired, and the position is determined based on the angle of inclination.

11. The information processing apparatus according to claim 2, further comprising:
a detector that detects that the information processing apparatus has been placed on a horizontal surface, wherein the information processing apparatus starts determining the position when the information processing apparatus has been placed on the horizontal surface.

12. The information processing apparatus according to claim 1, wherein the sensing unit is provided on a plurality of side surfaces of the case, and the sensor continuously extends across the plurality of side surfaces.

13. The information processing apparatus according to claim 12, wherein the sensor continuously extends across every side surface of the case.

14. The information processing apparatus according to claim 1, wherein the sensing unit is provided on a plurality of side surfaces of the case, the sensor extends as far as opposite ends of one of the side surfaces, and the sensor determines a position of the object in the direction perpendicular to the longitudinal direction.

15. The information processing apparatus according to claim 1, further comprising:
first circuitry configured to pick up a sound, wherein the display is controlled based on the sound.

16. The information processing apparatus according to claim 15, wherein the sound is at least one of a tapping and a scraping.

17. The information processing apparatus according to claim 15, further comprising:
second circuitry configured to pick up a sound, wherein a phase difference between the sound picked up by the first circuitry and the sound picked up by the second circuitry is measured to input an operation.

18. The information processing apparatus according to claim 1, wherein
a length of an area, on the side surface of the case, that all of the plurality of first sensors occupy in the longitudinal direction is equal to a length of the sensor in the longitudinal direction.

19. The information processing apparatus according to claim 18, wherein
a length of an area, on the side surface of the case, that all of the plurality of second sensors occupy in the longitudinal direction is equal to the length of the sensor in the longitudinal direction.

20. The information processing apparatus according to claim 1, wherein
a length of an area, on the side of the surface of the case, that one of the plurality of second sensors occupies in the longitudinal direction is equal to a length of an area, on the side of the surface of the case that at least two of the plurality of first sensors occupy in the longitudinal direction.

21. An information processing apparatus, comprising:
means for displaying an image, the means for displaying located on a front surface of a case; and
means for sensing, the means for sensing located on a side surface of the case facing away from the means for displaying, the means for sensing including:
(1) a means for detecting a position of an object, that does not touch the side surface of the case, in a longitudinal direction of the case, the first means disposed on the side surface of the case,
(2) a first means for detecting a distance between the object and the means for sensing in a direction perpendicular to the longitudinal direction and parallel to the front surface of the case, the first means for detecting the distance disposed on the side surface of the case and above or below the means for detecting the position relative to the front surface of the case, and
(3) a second means for detecting the distance between the object and the means for sensing in the direction perpendicular to the longitudinal direction and parallel to the front surface of the case, the second means for detecting disposed on the side surface of the case above or below the sensor relative to the front surface of the case.

22. A method, comprising:
sensing, by a sensing unit located on a side surface of a case facing away from a display, an object that does not touch the side surface of the case; and
controlling the display based on the sensing, the display located on a front surface of the case, the sensing unit including:
(1) a first plurality of sensors disposed on the side surface of the case and configured to detect a position of the object in a longitudinal direction of the case,
(2) a sensor disposed on the side surface of the case and above or below the plurality of sensors relative to the front surface of the case, the sensor configured to detect only a distance between the object and the sensing unit in a direction perpendicular to the longitudinal direction and parallel to the front surface of the case, and
(3) a second plurality of sensors disposed on the side surface of the case above or below the sensor relative to the front surface of the case, the second plurality of sensors configured to detect the distance between the object and the sensing unit in the direction perpendicular to the longitudinal direction and parallel to the front surface of the case.

* * * * *